Dec. 17, 1963     L. M. WYATT ETAL     3,114,688
FUEL ELEMENTS FOR NUCLEAR REACTORS
Filed May 1, 1959
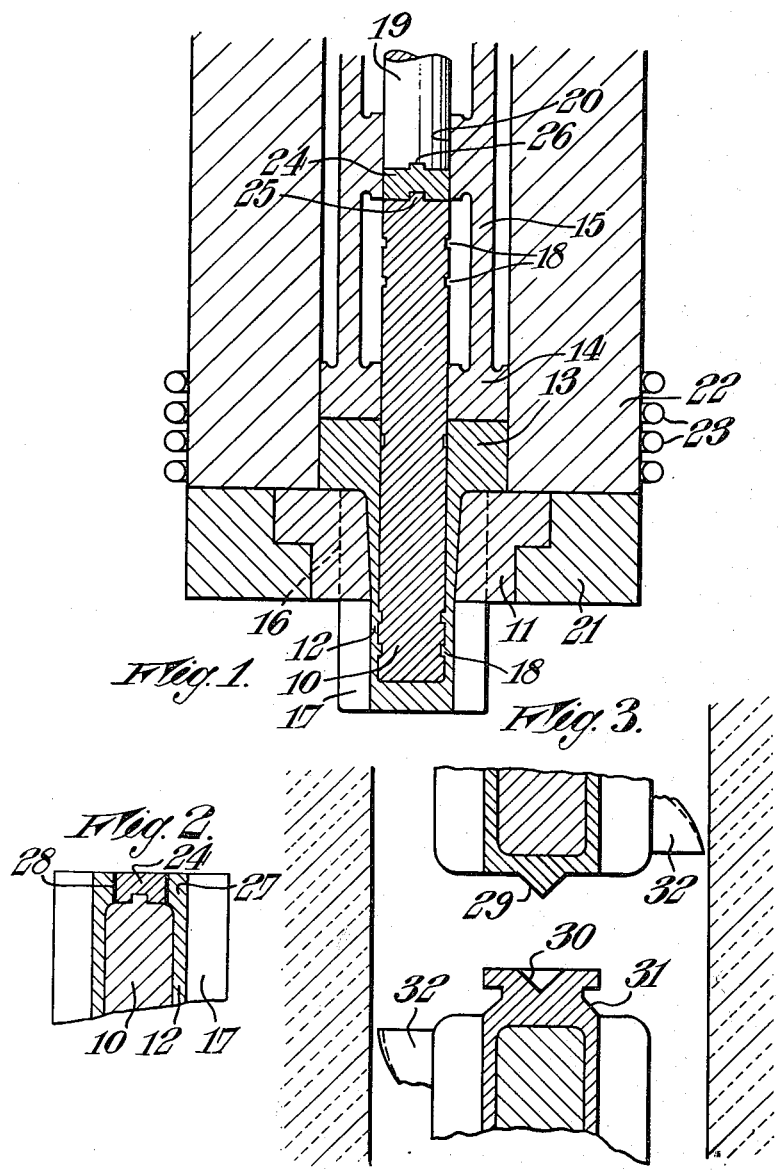
INVENTORS
LESLIE MARK WYATT
MALCOLM DOUGLAS JEPSON
BY *Larson and Taylor*

United States Patent Office 3,114,688
Patented Dec. 17, 1963

3,114,688
FUEL ELEMENTS FOR NUCLEAR REACTORS
Leslie Mark Wyatt, Appleton, and Malcolm Douglas Jepson, Culcheth, Warrington, England, assignors to United Kingdom Atomic Energy Authority, London, England
Filed May 1, 1959, Ser. No. 810,349
Claims priority, application Great Britain May 13, 1958
1 Claim. (Cl. 204—154.2)

This invention relates to fuel elements for nuclear reactors and is concerned with fuel elements which comprise nuclear fuel members enclosed in protective metal sheaths.

In a conventional method for the manufacture of a fuel element which comprises a nuclear fuel member enclosed in a protective sheath, an open-ended tube having accurate internal dimensions is formed in the sheath material, the nuclear fuel member also made to accurate dimensions, is inserted in the tube, and end caps are welded on the tube to complete the sheath. This method not only requires careful and detailed manufacture but also results in poor contact between the sheath and the fuel member such that a heat transfer medium may have to be introduced between the sheath and the fuel member to improve heat transfer between the two.

It is an object of the present invention to provide a method of making a fuel element which simplifies manufacture and brings the nuclear fuel member into close contact with the sheath.

According to the present invention a sheathed nuclear fuel member is formed by extruding sheath material through a die using the nuclear fuel member as the mandrel.

By extruding the sheath in the manner of the invention the nuclear fuel member and the sheath are brought into close contact and binding of the sheath to the fuel member can be effected by grooving the fuel member circumferentially or providing it with a roughened surface. The die may be shaped so as to produce a sheath with longitudinal fins and these may be twisted in helices by rotating the fuel member as the sheath is extruded. With the substantial frictional forces existing between the fuel member and the sheath this can be done. Alternatively fins may be machined or rolled on the sheath after extrusion.

The invention will now be described with reference to the accompanying drawing wherein:

FIG. 1 is a sectional view of a partially sheathed fuel member being passed through a die;

FIG. 2 is a section through the cropped end of a completely sheathed fuel member; and FIG. 3 is a fragmentary sectional view of co-operating ends of two finished fuel elements.

In FIG. 1 is shown a nuclear fuel member 10 passing through a die 11 held in a die plate 21 attached to the body of a press 22. As it passes through the die 11 the fuel member 10 is provided with a sheath 12 from a magnesium block 13 being forced through the die 11 by a piston 14 operated by tubular connecting rods 15. The die 11 is shaped with slots 16 to produce longitudinal fins 17 on the sheath 12. The body of the press 22 in the region of the die 11 is heated by an H.F. coil 23. The fuel member 10 acts as a mandrel in the die 11 and forms the sheath 12 so that it fits closely about the fuel member 10. Anti-ratcheting grooves 18 cut in the fuel member 10 assist in binding the sheath to the fuel member. The fuel member 10 is moved independently of the piston 14 by a ram rod 19 moving in a bearing 20 in the rod 15. Between the rod 19 and fuel member 10 is a magnesium plug 24 which pressure welds to the sheath 12 as it passes through the die 11 behind the fuel member. 10. The fuel member 10 and plug 24 are provided with keys 25, 26 respectively.

In FIG. 2 is shown the end of a fuel element formed in a die by the method described in relation to FIG. 1. The fuel member 10 has been passed right through the die 11 and extrusion of the sheath 12 and fins 17 continued for a short distance beyond the fuel member to produce an internally thickened part 27 which has welded to the plug 24 around its circumference 28. The ends of the fuel element are then machined to the shapes shown in FIG. 3. One fuel element end has a conical projection 29. The other has a conical recess 30 and an undercut portion 31 for engaging with a lifting grab on charging and discharging. The elements are fitted with helical splitter fins 32.

The block 13 is heated to 300° C. before insertion in the press 22, the fuel member 10 and plug 24 are cold.

The plug 24 between the rod 19 and fuel member 10 may be omitted. Extrusion is then continued beyond the fuel member as before, a separate peg is inserted within the thickened part 27 and the thickened part is swaged round the peg in the manner described in British Patent 773,771. The peg may be welded to the thickened part 27 and may carry a device for supporting the fuel element in a reactor fuel channel.

The longitudinal fins 17 may be formed helically by rotating the fuel member 10 and rod 19 during extrusion for which purpose the keys 25, 26 are provided. By the method of the invention the fins 17 can be carried the full length of the fuel element and do not have to be cut away so that an end cap can be welded on to the tubular sheath. This improves heat transfer from fuel element to coolant, cooling more effectively those parts which are normally stressed by end welding and smoothing out temperature variations normally occuring in the sheaths between consecutuive fuel members in a fuel element channel in a nuclear reactor. Also the space between consecutive fuel members in a fuel element channel may be reduced as less space is required than for conventional welded end caps. This saves neutrons, improves the neutron flux distribution along the fuel element channel and contributes to the smoothing out of temperature variations.

We claim:

A method of enclosing a nuclear fuel member of a given shape in a sheath comprising placing the nuclear fuel member in such relative dispostion with a die as to permit its use as a drawing mandrel, the said die having axially extending slots, interposing a plug of sheath material between the nuclear fuel member and a ram rod, and pushing the nuclear fuel member by the ram rod through a body of the sheath material disposed at the die so as to extrude the body of sheath material through the die only by said fuel member and form it about the nuclear fuel member without changing the shape of the fuel member, the plug of sheath material being pressure welded to the extruded sheath material as it passes through the die and the fuel member being rotated during the extrusion to form longitudinal helical fins of sheath material.

References Cited in the file of this patent

UNITED STATES PATENTS 1,167,626    Claremont et al. _____ Jan. 11, 1916

FOREIGN PATENTS 800,470    Great Britain _____ Aug. 27, 1958

1,027,336    Germany _____ Apr. 3, 1958

OTHER REFERENCES

International Conference on Peaceful Uses of Atomic Energy, 1955, vol. 9, pages 221–223.

AEC document NMI–4710, November 6, 1958.

TID–7546 (Book 1), "Fuel Elements Conference," March 1958, pages 120–135 and 157–166.